United States Patent [19]
Anderson et al.

[11] Patent Number: 5,259,580
[45] Date of Patent: Nov. 9, 1993

[54] CONTAINER HOLDER

[75] Inventors: Rick A. Anderson, Grand Haven; Lila F. Kortman, Zeeland, both of Mich.

[73] Assignee: Prince Corporation, Holland, Mich.

[21] Appl. No.: 25,951

[22] Filed: Mar. 3, 1993

[51] Int. Cl.$^5$ .................................... A47K 1/08
[52] U.S. Cl. ......................... 248/311.2; 224/42.45 R; 297/194
[58] Field of Search ............. 248/311.2; 224/42.45 R, 224/282, 275; 220/85 H, 341, 349; 211/88; 297/194; 108/25, 26

[56] References Cited

U.S. PATENT DOCUMENTS

| | | |
|---|---|---|
| 2,778,702 | 1/1957 | Franks . |
| 4,583,707 | 4/1986 | Anderson . |
| 4,645,157 | 2/1987 | Parker . |
| 4,728,018 | 3/1988 | Parker . |
| 4,733,908 | 3/1988 | Dykstra et al. . |
| 4,783,037 | 11/1988 | Flowerday . |
| 4,792,184 | 12/1988 | Lindberg et al. . |
| 4,818,017 | 4/1989 | Dykstra et al. . |
| 4,848,627 | 7/1989 | Maeda et al. . |
| 4,928,865 | 5/1990 | Lorence et al. . |
| 4,943,111 | 7/1990 | VanderLaan . |
| 4,953,771 | 9/1990 | Fischer et al. . |
| 4,955,571 | 9/1990 | Lorence et al. . |
| 5,007,610 | 4/1991 | Christiansen et al. . |
| 5,024,411 | 6/1991 | Elwell ...................... 224/42.42 R X |
| 5,060,899 | 10/1991 | Lorence et al. . |
| 5,072,989 | 12/1991 | Spykerman et al. . |
| 5,087,008 | 2/1992 | Miller et al. . |
| 5,096,152 | 3/1992 | Christiansen ................... 224/275 X |
| 5,104,184 | 4/1992 | Kwasnik et al. . |
| 5,104,185 | 4/1992 | Christiansen et al. . |
| 5,104,186 | 4/1992 | Kwasnik et al. . |
| 5,104,187 | 4/1992 | Fischer et al. . |
| 5,131,716 | 7/1992 | Kwasnik et al. . |
| 5,171,061 | 12/1992 | Marcusen ...................... 248/311.2 X |
| 5,190,259 | 3/1993 | Okazaki ........................ 297/194 X |
| 5,195,711 | 3/1993 | Miller ............................ 297/194 X |

FOREIGN PATENT DOCUMENTS 3143957 5/1983 Fed. Rep. of Germany ...... 297/194

OTHER PUBLICATIONS

Exhibits A1-A10 are nine photographs and a sketch of a Lexus cupholder, which cupholder was publicly shown in the U.S. by Lexus Corporation and is prior art.

Primary Examiner—J. Franklin Foss
Attorney, Agent, or Firm—Price, Heneveld, Cooper, DeWitt & Litton

[57] ABSTRACT

A container holder is provided including a receptacle member adapted for mounting in a vehicle. A container holder member is pivotally mounted in the receptacle, and a pair of arms are pivotally mounted on the container holder member. One of the arms includes a downwardly extending protrusion that engages a catch on the receptacle member so that the arm is moved between an extended position and a retracted position as the container holder member is moved between an open use position and a closed storage position, respectively. The second arm is operably interconnected with the first arm so that it operates in tandem with the arm as the one arm is moved. A push-open latch, spring, and damper are operably attached to the container holder member so that the container holder member automatically opens in a smooth and aesthetic manner when the container holder member is pressed and released.

20 Claims, 6 Drawing Sheets

CONTAINER HOLDER

BACKGROUND OF THE INVENTION

The present invention relates to container holders for vehicles, and in particular to a container holder having improved actuation of movably mounted container holder arms.

Several existing container holders for vehicles now include moveable arms that open to form an aperture for receiving a beverage container and that close to allow compact storage. However, automotive designers continue to search for innovative ways to control and improve the arm movement. In particular, many container holders have arms that are spring biased outwardly but which frictionally engage the edge of a receiving receptacle to which the container holder is mounted so that the arms are forced to collapse as the container is closed. However, the area of contact between the arms and the receptacle wears over time causing a scuffed area having an unsightly appearance which leads to customer complaint and dissatisfaction. Further, in many of these arms, the motion of the arms as they abut the receptacle and are forced inwardly is choppy and discontinuous, and the feel is less than luxurious.

U.S. Pat. No. 5,007,610 discloses a cupholder including a mechanical linkage and camming mechanism adapted to force a pair of aperture forming arms outwardly as the cupholder is moved to an extended use position. However, in this cupholder, the mechanism is somewhat complex and requires numerous parts for its operation. Further, the motion of the arms tends to be abrupt, and is not as smooth and luxurious as is desired. Further, no automatic opening means is provided or disclosed, and the disclosed cupholder would require significant modifications in order to include same.

Thus, a container holder solving the aforementioned problems is desired.

SUMMARY OF THE INVENTION

The present invention includes a container holder for a vehicle including a receptacle member having a sidewall, and a container holder member pivotally mounted to the receptacle member for movement between a closed position for storage and an open position for use. At least one arm is pivotally attached to the container holder member for movement between a retracted position for storage and an extended position in which the container holder member and arm form an aperture adapted to receive a beverage container. The arm includes an actuator spaced from the axis of rotation defined by the arm. A catch is located on the sidewall of the receptacle member, the catch being adapted to operably engage the actuator so that the arm moves to the extended position as the container holder member is moved to the open position.

In the preferred form, the actuator is a protrusion that extends downwardly from the arm and is located generally in a hidden position, and the catch is a depression in the sidewall of the receptacle member that is adapted to receive the actuator and thus pivot the arm. Such a system provides a compact and attractive container holder for mounting within a vehicle. Further, the combination of this system with a push-open latch arrangement and a biasing spring/dampener opening mechanism provides for an aesthetic and automatic arm movement.

These and other features and advantages of the present invention will become apparent upon reading the following description thereof together with reference to the accompanying drawings.

DETAILED DESCRIPTION OF THE PREFERRED EMBODIMENT

Figure 1:
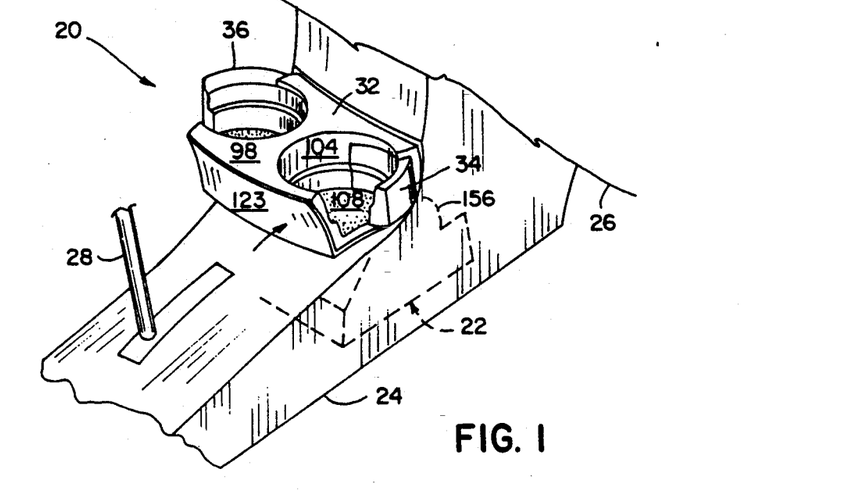
FIG. 1 is a perspective view of a container holder embodying the present invention, the container holder being mounted in a vehicle console and being shown in an open position for use.
Figure 2:
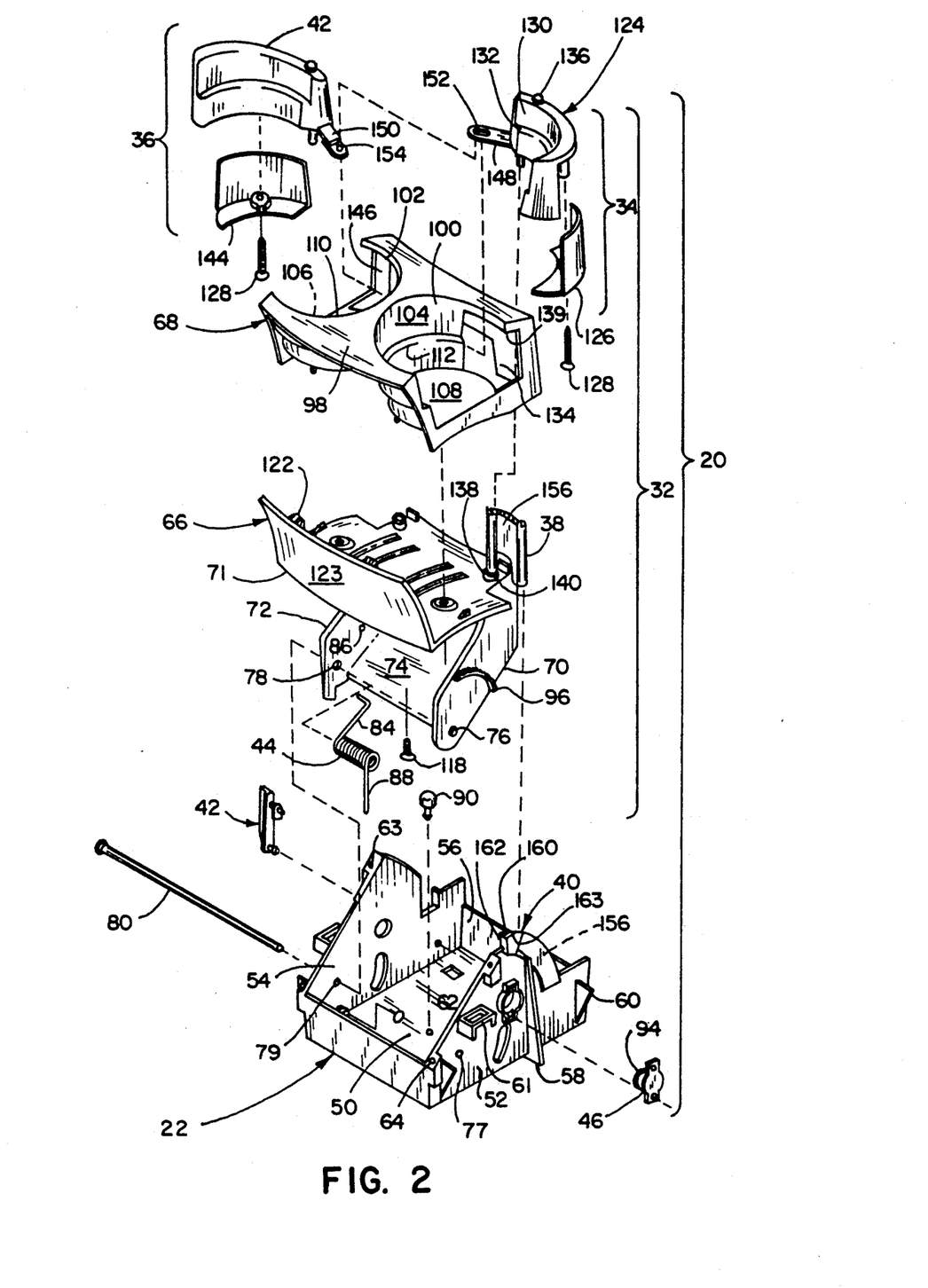
FIG. 2 is an exploded perspective view of the container holder illustrated in FIG. 1.
Figure 3:
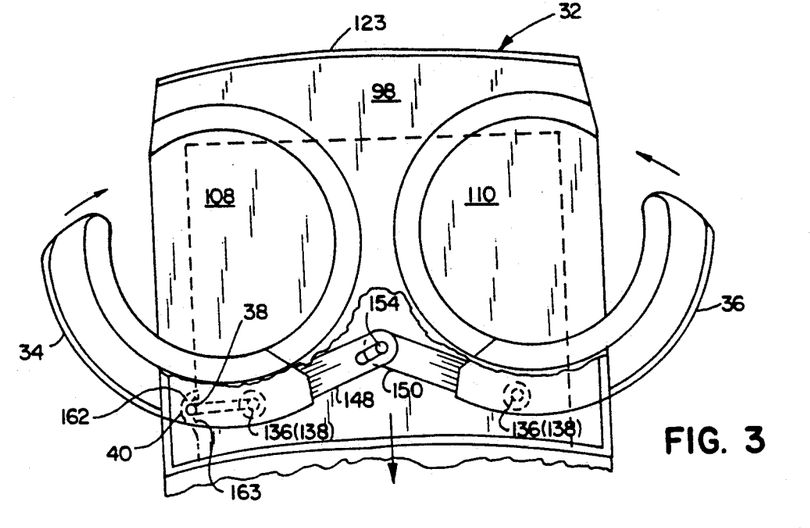
FIG. 3 is a top plan view of the container holder illustrated in FIG. 1.
Figure 4:
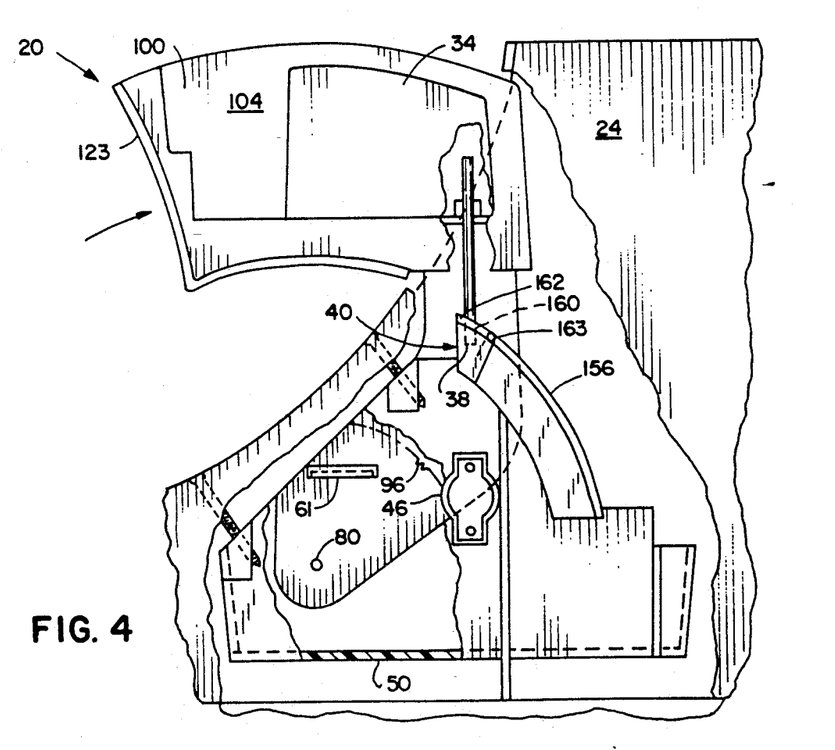
FIG. 4 is a side view of the container holder illustrated in FIG. 1 with the console partially broken-away to expose the container holder.
Figure 5:
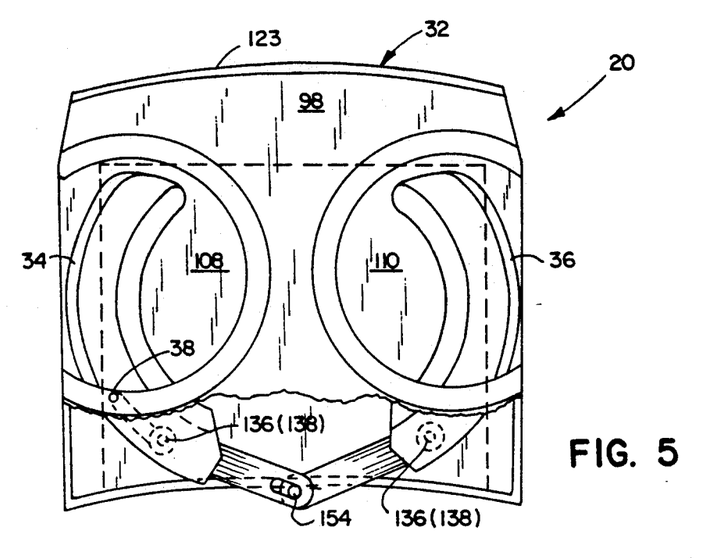
FIG. 5 is a plan view of the container holder illustrated in FIG. 1 but with the container holder being shown in a closed position.
Figure 6:
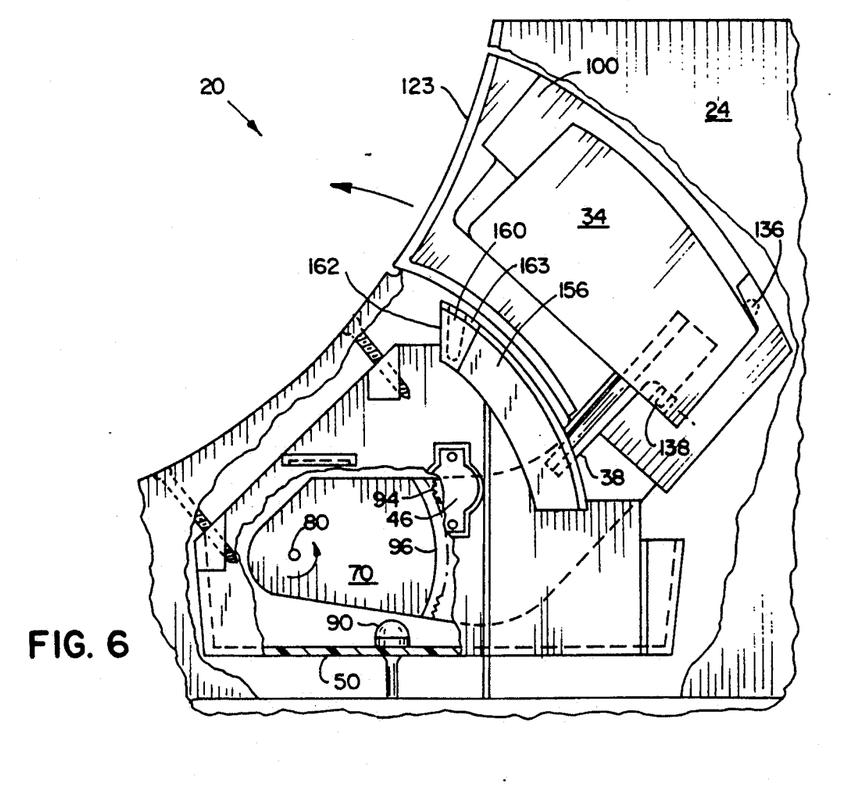
FIG. 6 is a side view of the container holder illustrated in FIG. 1 but with the container holder being shown in the closed position.

A container holder 20 (FIGS. 1-2) embodying the present invention includes a receptacle member 22 adapted for mounting in a console 24. It is contemplated that container holder 20 will be mounted under a vehicle dash 26 and in front of a center floor shifter 28, though the invention is not contemplated to be limited to only this arrangement. A container holder member 32 is pivotally mounted in receptacle member 22, and a pair of arms 34 and 36 are pivotally mounted on container holder member 32. Arm 34 includes a downwardly extending, visually hidden actuator or protrusion 38 (FIG. 2) that engages a catch 40 on receptacle member 22 so that arm 34 is moved between an extended position (FIGS. 3-4) and a retracted position (FIGS. 5-6) as container holder member 32 is moved between an open use position (FIGS. 3-4) and a closed storage position (FIGS. 5-6), respectively. Arm 36 is operably interconnected with arm 34 so that it operates in tandem with arm 34. A push-open latch 42, a bias spring 44, and a damper 46 are operably mounted on receptacle member 22 and container holder member 32 so that they cooperate to automatically open container holder 20 after the container holder member 32 is pressed and released.

More specifically, receptacle member 22 (FIG. 2) includes a bottom 50 and sidewalls 52 and 54 that form a space 56 configured to receive container holder member 32. Sidewalls 52 and 54 are generally planar in shape, and include various reinforcement ribs such as ribs 58 and 60 as required for stiffness. Sidewalls 52 and 54 and also bottom 50 include various attachment slots/bosses such as slots 61 and 62 and bosses 63 and 64 for securing receptacle member 22 to console 24 and/or for securing a trim plate (not shown) to receptacle member 22.

Container holder member 32 (FIG. 2) includes a pivot forming lower portion 66 and a container holder forming upper portion 68 adapted to attach to lower portion 66. Lower portion 66 includes an L-shaped tray 71 with a pair of spaced apart sidewall-like legs 70 and 72 that extend downwardly. Legs 70 and 72 are supported by a reinforcement web 74 that extends between the legs. Legs 70 and 72 on container holder member 32 include holes 76 and 78 and sidewalls 52 and 54 of receptacle member 22 include corresponding holes 77 and 79. Holes 76, 77, 78 and 79 align to receive a rod-like pivot pin 80 for pivotally mounting container holder member 32 to receptacle member 22. Coil spring 44 is mounted on pivot pin 80. Coil spring 44 includes a first end 84 that engages a hole 86 in leg 72, and includes a second end 88 that rests against receptacle bottom 50. Spring ends 84 and 88 hold spring 44 in compression so that spring 82 biases container holder member 32 toward an open position with respect to receptacle member 22.

A bumper 90 is attached to bottom 50. Bumper 90 limits the travel of container holder member 32 as it is moved to a closed position by abuttingly engaging web 74 between legs 70 and 72. Silicon damper 46 is attached to sidewall 52. Damper 46 includes a rotatable gear 94 that extends through sidewall 52 into operative contact with a gear-like rack 96 on leg 70. The movement of gear 94 is dampened by damper 92 so that the movement of container holder member 32 automatically moves smoothly and with a luxurious motion as it is biased to an open position by biasing spring 44.

Figures 7, 7A:
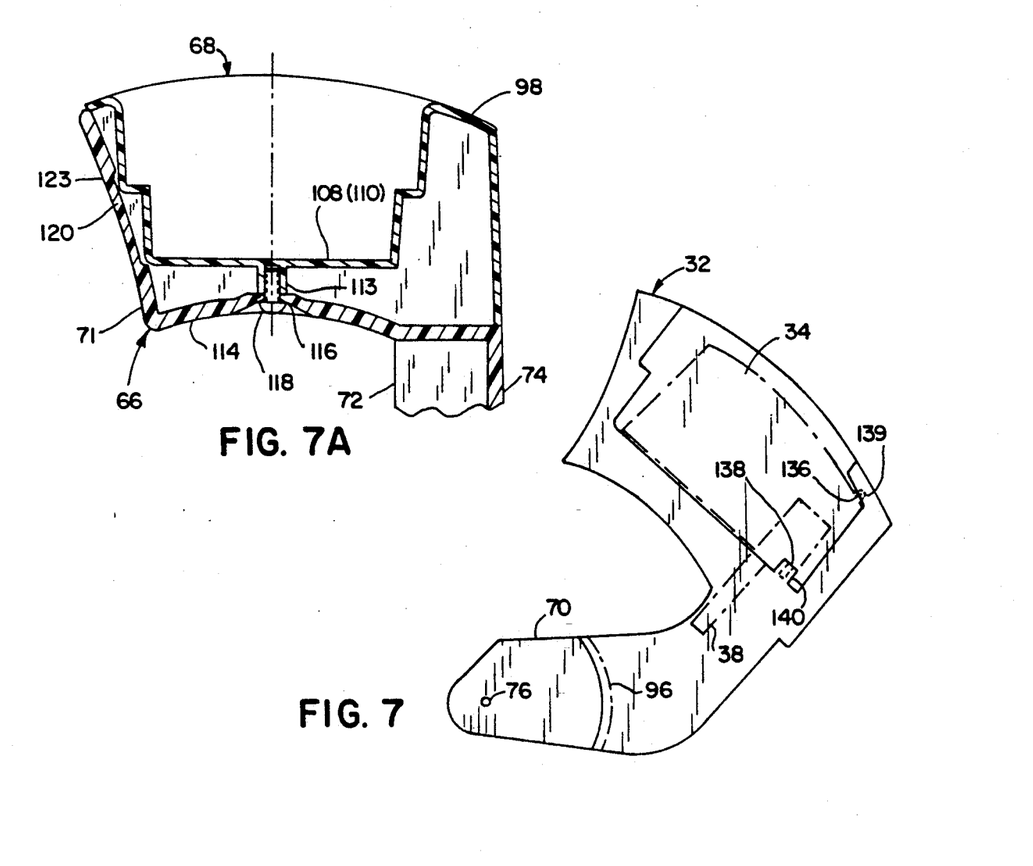
FIG. 7 is a side view of the container holder member illustrated in FIG. 6, the arm being shown in phantom.
FIG. 7A is a side cross-sectional view showing the upper portion of the container holder member illustrated in FIG. 7.

Upper portion 68 includes an upper wall 98 with a pair of outwardly facing C-shaped apertures 100 and 102 formed therein. Arcuately-shaped walls 104 and 106 extend downwardly from the edges of C-shaped apertures 100 and 102, respectively. A pair of container supporting bottom walls 100 and 110 are connected to the bottom of arcuately-shaped walls 104 and 106. Arcuately-shaped walls 104 and 106 include a ridge 112 that extends around the walls, ridge 112 acting to stiffen the walls and also to provide a smaller diameter bottom area for supporting a container (not shown) having a tapered sidewall. (See FIG. 7A.)

Two or more bosses 113 (FIG. 7A) extend downwardly from bottom walls 108 and 110. The L-shaped tray 71 includes a bottom wall section 114 that mateably receives upper portion 68. Tray bottom section 114 includes holes 116 that align with bosses 113, and screws 118 extend through holes 116 into bosses 113 to secure upper portion 68 to lower portion 66. Tray 71 further includes a front wall section 120 adapted to mateably engage a front side of upper portion 68. A pair of hook-like tabs 122 (FIG. 2) securely retain upper portion 68 to front section 120. Front wall section 120 includes an outer show surface 123 that is curvilinearly shaped and textured and/or painted to match the console and the interior vehicle design.

Arm 34 (FIG. 2) includes a front half 124 and a rear half 126 secured together by a screw 128. Front half 124 includes a surface 130 with ridge 132 corresponding in shape to arcuately shape wall 104 and ridge 112. The rear outer portion of arcuately-shaped wall 104 is cutaway to form an opening 134 for receiving arm 34. Arm 34 includes an upwardly oriented pin-like protrusion 136 and also includes a downwardly extending pin-like protrusion 138 aligned with first protrusion 136. Upper portion 68 includes a first boss 139 (FIG. 7) and lower portion 66 includes an aligned opposing second boss 140, bosses 139 and 140 being adapted to operably receive protrusions 136 and 138, respectively. By this arrangement, arm 34 is pivotally mounted in opening 134.

Arm 36 also includes a front half 142 and rear half 144 that are secured together in a manner comparable to that of arm 34. Arm 36 is pivotally secured in an opening 146 in arcuately-shaped wall 106 also in manner comparable to a way in which arm 34 fits in opening 134 between upper portion 68 and lower portion 66.

Arms 34 and 36 include laterally extending tabs 148 and 150 respectively that overlap at their extreme ends. Tab 148 includes a slot 152 and tab 150 includes a pin 154, pin 154 being slideably disposed in slot 152. As arm 34 pivots, tab 148 pivots about the axis of rotation defined by protrusions 136/138. Due to the interaction of pin 154 in slot 152, arm 36 is caused to simultaneously pivot as arm 34 pivots, but arm 36 pivots in an opposite direction. In this way, arms 34 and 36 are operably interconnected to container holder member 32.

Figures 8, 9, 10, 11, 12:
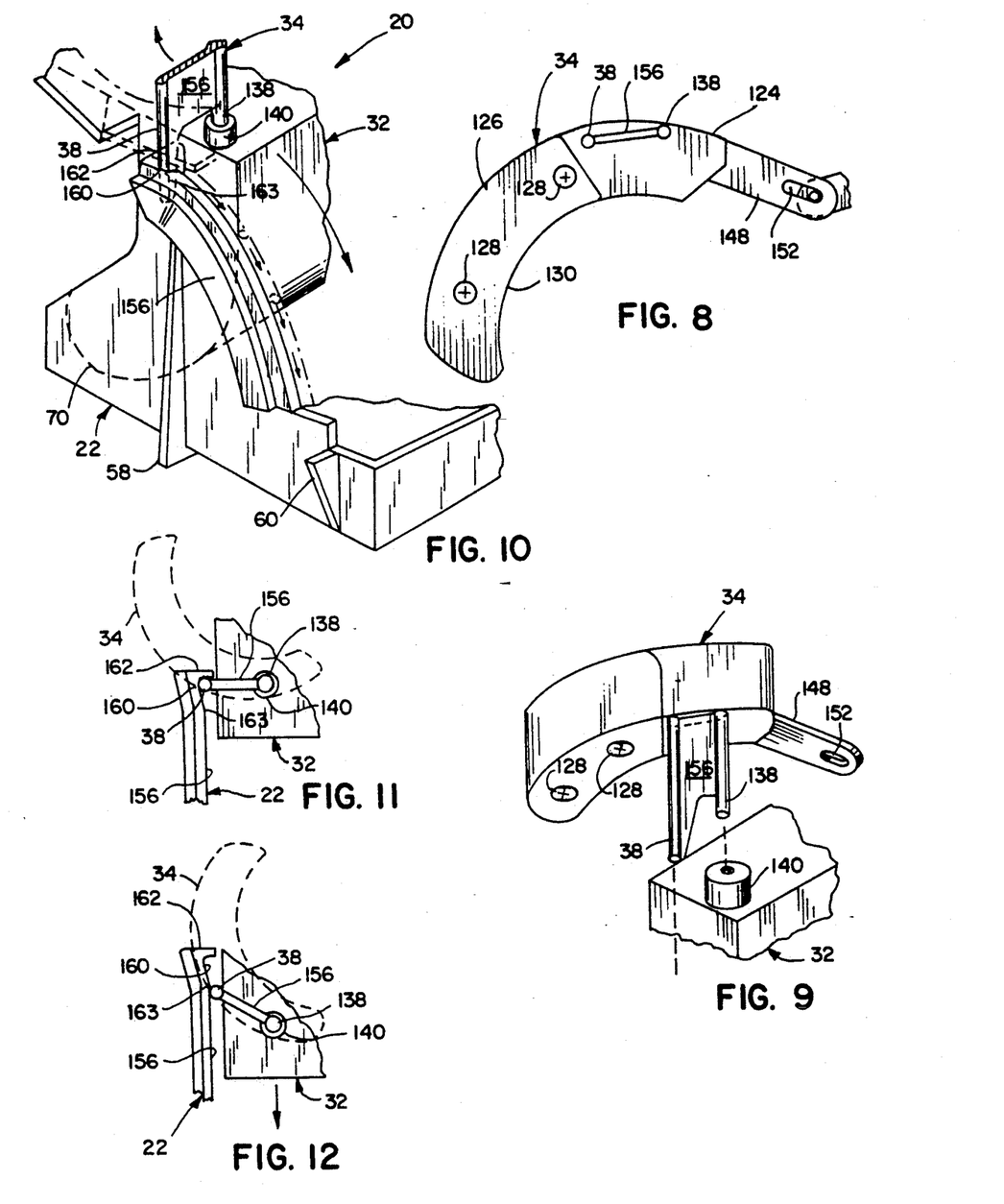
FIG. 8 is a bottom view of the arm including the actuator.
FIG. 9 is an exploded fragmentary perspective view of the container holder showing the relationship of the arm and actuator to the lower pivot-pin-receiving boss on the container holder.
FIG. 10 is a perspective view illustrating the movement of the actuator with the container holder being shown in the open position and including arrows indicating the movement of the actuator as the container holder is moved to the closed position.
FIG. 11 is a top plan view showing the actuator in the open position with the arm being shown in phantom.
FIG. 12 is a top plan view showing the actuator in the retracted position with the arm being shown in phantom.

As previously noted, arm 34 also includes actuator 8. Actuator 38 is an elongate protrusion extending downwardly from the bottom of arm 34. Actuator 38 is stabilized by a web 156 that extends between a protrusion-like actuator 38 and the elongate protrusion pivot protrusions 136/138. Actuator 38 is positioned to slideably engage a surface 156 on the upper edge of sidewall 52 as container holder member 32 is pivoted in receptacle member 22. (See FIGS. 2 and 10.) Surface 156 is spaced from sidewall-like leg 70 and forms a space therebetween for receiving the lower end of actuator 38. Surface 156 includes catch 40 which is formed by a depression 160 and an inwardly oriented flange 162. Flange 162 is adapted to grab actuator 38 and move actuator 38 into depression 160 as container holder member 32 reaches the open position (FIGS. 10-11). In other words, as container holder member 32 is pivoted toward the open position, actuator 38 moves against flange 162 and into depression 160 causing arm 34 to pivot outwardly. Notably, by varying surface 156 and also the mating surface on sidewall-like leg 70, the angular movement of arms 34 and 36 can be controlled. Depression 160 further defines a cam 163 opposite flange 162. Cam 163 acts against actuator 38 to move arm 34 (and 36) to the closed position as container holder 20 is closed (FIGS. 3, 5, 10, 11 and 12).

It is noted that only arm 34 includes an actuator 38. However, it is contemplated that both arms 34 and 36 could include an actuator, in which case tabs 148 and 150 would be eliminated. Due to the design of sidewalls 52 and 54 and legs 70 and 72 there is some resiliency in the arrangement so that forcing arms 34 and/or 36 open or closed does not break actuator 154 or any of the other parts.

Push-open latch 42 is pivotally mounted on sidewall 54 and is adapted to engage ridges 166 on sidewall-like leg 72. Ridges 166 include an island 168 having an inclined surface 170 on one side and a depression 172 on the other side. Ridges 166 further include an inclined surface 176 adapted to direct a latch pin 178 on latch 42 into depression 172. Ridges 166 further include inclined surfaces 180 and 182 that direct latch pin 178 out of depression 172 and into a latch-ready position.

Figures 13, 16, 17:
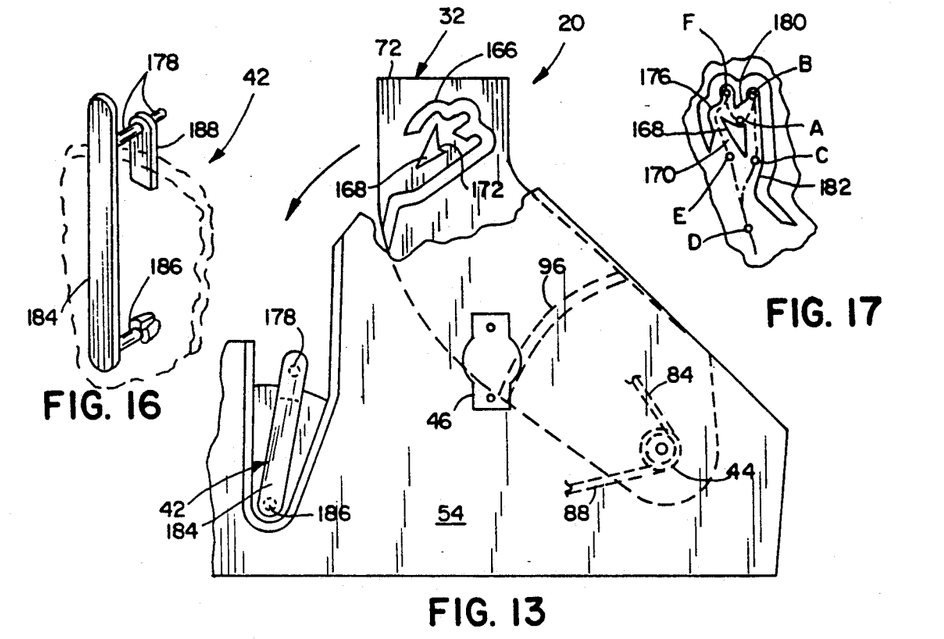
FIG. 13 is a side view of the container holder showing the push-open latch, the container holder being shown in the open position and the container holder being partially broken-away to show the ridges for operably engaging the latch.
FIG. 16 is a perspective view of the latch.
FIG. 17 is a side view of the ridges for engaging the push-open latch, with the path of the latching pin being shown in phantom.
Figure 14:
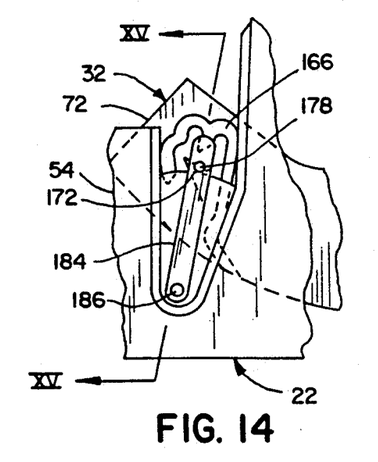
FIG. 14 is a side view of the latch in the closed position.
Figure 15:
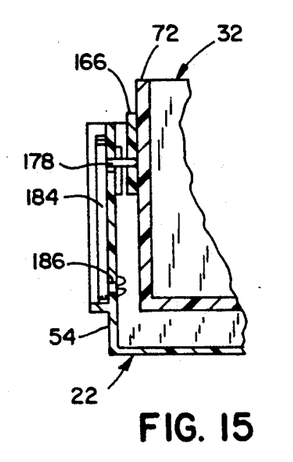
FIG. 15 is a sectional view taken along the plane XV—XV in FIG. 14.

In particular, latch 42 (FIGS. 13-16) includes an elongate member 184 pivotally connected to sidewall 54 by pivot 186. Latch pin 178 extends from elongate member 184 at a position spaced from pivot 186. A retainer 188 is secured to latch pin 178 to hold latch 42 to sidewall 54. The tip of latch pin 178 extends through retainer 188 and into ridges 166 on sidewall 72 of container holder member 32. Retainer holder member 32 is held in the closed position when latch pin 178 is in depression 172 (FIG. 14). In this position, bias spring 44 biases latch pin 178 into depression 172 and thus stably holds container holder member 32 in the closed position. Arms 34 and 36 are held in the retracted position by actuator 38 on arm 34 which is biased by surface 156 on sidewall 52 (FIG. 12).

When container holder member 32 is pressed such as by pressing on the show surface 123 on front section 120, latch 42 rotates to a release position. In particular, latch pin 178 engages inclined surface 180 to move from the closed rest position A to release position B (FIG. 17). When released and biased toward the open position by bias spring 44, latch pin 178 engages inclined surface 182 at position C to move to a latch-ready position D. Bias spring 44 then automatically opens container holder member 32 to the open position in a smooth and aesthetic manner as controlled by damper 92. As container holder member 32 opens, actuator 38 slides along surface 156 on sidewall 52 (FIG. 10) until it reaches catch 40 (FIG. 10). Catch 40 grabs actuator 38 and moves actuator 38 into depression 160. This causes arm 34 to rotate from the retracted position to the extended position ready for use. Arm 36 opens with arm 34, and thus forms a pair of container holding apertures with container holder upper portion 68 for receiving beverage containers.

When container holder member 32 is to be closed, it is rotated against the bias spring 44 by the operator. As latch pin 178 approaches island 168, latch pin 178 engages inclined surface 170 at position E (FIG. 17). Inclined surface 170 rotates latch pin 170 past island 168. Inclined surface 176 then rotates latch pin 178 into alignment with depression 172 at position F so that when released, container holder member 32 is then again held in the closed position by latch pin 178 engaging depression 172.

Thus, a container holder is disclosed that automatically opens when pressed and released, the container holder including arms that automatically open in a smooth and aesthetic manner, but which also automatically close when the cupholder is closed. Further, the container holder includes a minimum of pieces, which pieces are arranged in a durable manner and operate to move the arms in a highly refined and aesthetic manner. Further, the movement of the arms can be readily adjusted during design of the parts to obtain the movement desired.

It will become apparent to those skilled in the art that various modifications to the preferred embodiment of the invention can be made without departing from the spirit or scope thereof as defined by the appended claims. The embodiments of the invention in which an exclusive property or privilege is claimed are defined as follows.

I claim:

1. A container holder for a vehicle comprising:
   a receptacle member including a sidewall;
   a container holder member pivotally mounted to said receptacle member for movement between a closed position for storage inside said receptacle member and an open position outside of said receptacle member for use;
   an arm pivotally attached about an axis of rotation to said container holder member for movement between a retracted position for storage and an extended position in which said container holder member and said arm form an aperture adapted to receive a beverage container, said arm including an actuator spaced from the axis of rotation defined by the arm but in a position on said arm that is generally hidden from view;
   a catch located on said sidewall for operably engaging said actuator to pivot said arm to the extended position as said container holder member is moved to the open position; and
   means for moving said arm to the retracted position when said container holder is moved to the closed position.

2. A container holder as defined in claim 1 including means for automatically pivoting said container holder member to the open position.

3. A container holder as defined in claim 2 including a push-open latch for latching said container holder in the closed position.

4. A container holder as defined in claim 1 in which the means for moving said arm to the retracted position is a cam means provided in combination with said catch.

5. A container holder as defined in claim 1 wherein said container holder member includes a second sidewall spaced from said receptacle member sidewall, and said actuator extends into the space defined between the planes of said container holder sidewall and said receptacle member sidewall.

6. A container holder as defined in claim 5 wherein said sidewalls include opposing surfaces between and along which said actuator slides, said surfaces controlling the angular movement of said actuator and said arm as said container holder is being moved.

7. A container holder as defined in claim 1 wherein said actuator is a protrusion that extends downwardly below said arm.

8. A container holder as defined in claim 1 wherein said arm includes a pivot means and said container holder includes an aperture for pivotally receiving said pivot means to pivotally mount said arm to said container holder, and wherein said pivot means and said actuator are parallel pin-like members.

9. A container holder as defined in claim 8 wherein said actuator is a protrusion and a web is provided connecting said protrusion and pivot means whereby said web stabilizes said protrusion and pivot means.

10. A container holder as defined in claim 1 including a second arm, and interconnecting means for interconnecting said first and second arms so that said arms move simultaneously to the retracted position and also to the extended position as the first arm is actuated by said actuator and said means for moving said arm.

11. A container holder as defined in claim 10 wherein said interconnecting means includes a slot in one of said arms and a pin in the other of said arms, said pin being slideably disposed in said slot.

12. A container holder as defined in claim 1 wherein said catch includes a depression in said receptacle member sidewall.

13. A container holder for a vehicle comprising:
a receptacle member including a sidewall;
a container holder member movably mounted to said receptacle member for movement between a closed position for storage inside said receptacle member and an open position outside of said receptacle member for use;
a pair of arms movably attached about an axis of rotation to said container holder member for movement in a common plane between a retracted position for storage and an extended position in which said container holder member and said arms form a pair of apertures adapted to receive beverage containers, one of said arms including a protrusion spaced from the axis of rotation defined by the one arm;
engaging means on said receptacle member for operably engaging said protrusion to pivot said one arm to the extended position as said container holder member is moved to the open position and to pivot said one arm to the retracted position as said container holder member is moved to the closed position; and
interconnecting means for interconnecting said arms so that said arms move simultaneously to the retracted position and also to the extended position as said one arm is actuated by said protrusion and said engaging means.

14. A container holder as defined in claim 13 including means for automatically pivoting said container holder to the open position.

15. A container holder as defined in claim 14 including a push-open latch for latching sad container holder in the closed position.

16. A container holder as defined in claim 13 wherein said one arm includes a pivot means and said container holder includes an aperture for pivotally receiving said pivot means to pivotally mount said one arm to said container holder, and wherein said pivot means and said actuator are parallel pin-like members.

17. A container holder as defined in claim 13 wherein said engaging means includes a catch for engaging the protrusion to move said one arm to the open position, and further includes a cam means for engaging the protrusion to move said one arm to the closed position.

18. A container holder as defined in claim 13 wherein said container holder member includes a second sidewall spaced from said receptacle member sidewall, and said protrusion extends into the space defined between said sidewalls.

19. A container holder as defined in claim 13 wherein said interconnecting means includes a slot in one of said arms and a pin in the other of said arms, said pin being slideably disposed in said slot.

20. A container holder for a vehicle comprising:
a receptacle member including first and second sidewalls;
a container holder member movably mounted to said receptacle member between said first and second sidewalls, said container holder being movable between a closed position for storage and an open position for use, said container holder member including a third sidewall spaced from and parallel to said first sidewall;
an arm movably attached to said container holder member for movement between a retracted position for storage and an extended position in which said container holder member and said arm form an aperture adapted to receive a beverage container, said arm including a protrusion spaced from the axis of rotation defined by the arm, said protrusion being positioned between the planes of said first and third sidewalls; and
engaging means on said first sidewall for operably engaging said protrusion so that said arm pivots to the extended position as said container holder member is moved to the open position, said first sidewall on said receptacle and said third sidewall on said container holder member cooperating to control said protrusion and hence move said arm to the retracted and extended positions.

* * * * *

UNITED STATES PATENT AND TRADEMARK OFFICE
CERTIFICATE OF CORRECTION

PATENT NO. : 5,259,580
DATED : November 9, 1993
INVENTOR(S) : Rick A. Anderson et al.

It is certified that error appears in the above-indentified patent and that said Letters Patent is hereby corrected as shown below:

Column 3, line 66;
"bottom walls 100 and 110" should be --bottom walls 108 and 110--.

Column 4, line 50;
"actuator 8" should be --actuator 38--.

Column 8, claim 15, line 5;
"sad" should be --said--.

Signed and Sealed this

Twenty-sixth Day of July, 1994

*Attest:*

BRUCE LEHMAN

*Attesting Officer*   *Commissioner of Patents and Trademarks*